No. 797,409. PATENTED AUG. 15, 1905.
F. M. DAVIS.
CALIPERS.
APPLICATION FILED DEC. 16, 1904.
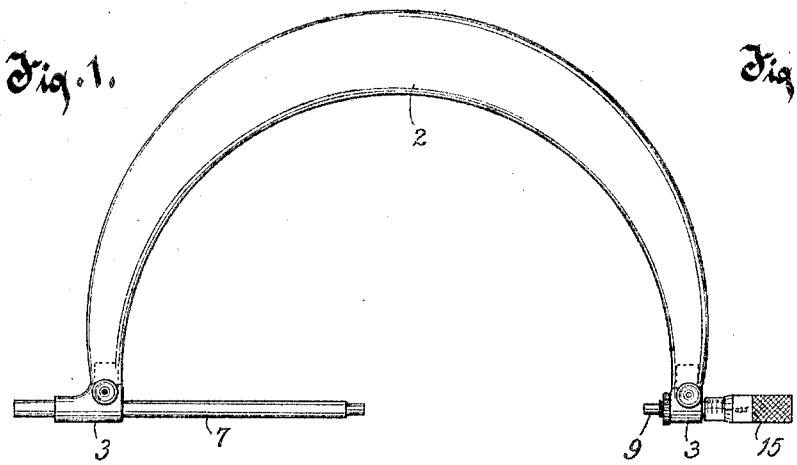
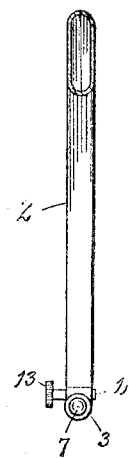
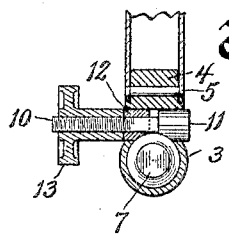
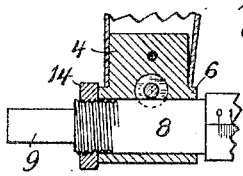
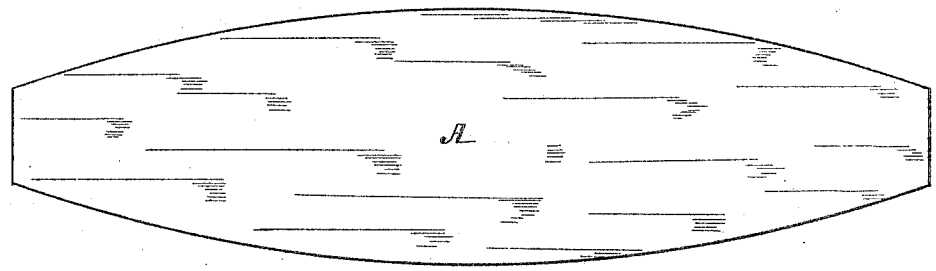
Witnesses.
C. H. Keeney,
Anna F. Schmittbauer
Inventor.
Frank M. Davis
By Benedict & Morsell
Attorneys.

UNITED STATES PATENT OFFICE.

FRANK M. DAVIS, OF MILWAUKEE, WISCONSIN.

CALIPERS.

No. 797,409. Specification of Letters Patent. Patented Aug. 15, 1905.

Application filed December 16, 1904. Serial No. 237,101.

*To all whom it may concern:*

Be it known that I, FRANK M. DAVIS, residing in Milwaukee, in the county of Milwaukee and State of Wisconsin, have invented new and useful Improvements in Calipers, of which the following is a description, reference being had to the accompanying drawings, which are a part of this specification.

Calipers in various forms are in small sizes employed very widely for measuring small articles having convex or concave faces and having micrometers on or with them are capable of determining and indicating variations in measurement of a fraction of a thousandth of an inch, and not only are small articles thus measured, but in the mechanic arts of the present day it has become necessary to measure with exactness, even to the fraction of a thousandth of an inch, large articles such as the interior of the cylinders of engines of large size, the exterior of pistons, and of shafts of relatively great diameter. A caliper that is large enough to be adapted for measuring large articles must be of correspondingly large size, and it must be strong and rigid, so as not to be capable of vibration or yielding, and while strong and rigid it is also important that it be light in weight, so as to be adapted to be readily and even easily handled by the workman. A workman cannot use a large caliper weighing as much as the large calipers now in use do for a very long time before his arm becomes so tired of holding out the implement that he cannot make careful and exact measurements with it. Not only this, but the heavy calipers in common use are, because of their weight, not adapted to respond to or to transmit to the hand of the user the initial contact or slight touches of the instrument on the article to be measured in such manner as is desirable for obtaining the best results.

A chief object of my invention is to provide a caliper-frame that is exceedingly strong in its structure, that is absolutely rigid in quality, and that is very light in weight, while it can be produced in simple form at a minimum of expense; also with my improved caliper-frame I provide improved means for adjusting and clamping the spindles in the legs of the frame, whereby a more ready adjustment and secure holding of the spindles and their sleeves can be obtained than has heretofore been secured.

The invention consists of the improved caliper and its combinations, as herein described and claimed, or the equivalents thereof.

Calipers are employed for outside and for inside measurements, and for convenience of illustration I have shown a caliper embodying my improvements adapted for outside measurements; but it will be understood that by reversing the direction of the projection of the spindles the caliper would be adapted for making inside measurements.

In the drawings, Figure 1 shows my improved caliper. Fig. 2 is a central vertical section of the caliper shown in Fig. 1 looking toward the left. Fig. 3 is a section at a right angle to the length of the caliper of the construction in detail at the left in Fig. 1. Fig. 4 is a section in the direction of the length of the caliper of the details of construction at the right in Fig. 1. Fig. 5 represents the blank in the form and as cut from sheet-steel for the manufacture therefrom of the principal portion of the frame of my improved caliper. Fig. 6 represents that portion of the frame of the caliper made from the blank shown in Fig. 5 after it has been through the process of folding the sheet metal along its longitudinal axis and the subsequent process of bending it into the curved or crescent form which it has in the completed caliper, but before the outer edges have been brought together and brazed. Fig. 7 is an edge view of the portion of the frame in the same state of manufacture made from the blank shown in Fig. 5, which portion of the frame is shown in elevation in Fig. 6.

In the drawings, 2 represents the chief or body portion of the caliper-frame. This frame is constructed of sheet-steel, is hollow from end to end, is light in weight, and is strong and rigid in quality. At each end this body portion of the frame is provided with leg terminals or boxes 3. These boxes are of metal and are substantially solid, being each provided with a tang 4, that fits into the hollow of the leg of the body 2 of the frame at the end thereof and is secured therein by a rivet 5, advisably brazed in place. At the inner end of the tang 4 there is a shoulder 6, against which the end of the leg of the body of the frame fits and rests. The box 3 at the left in Fig. 1 is bored in the direction of the length of the caliper to receive snugly but adjustably therein the spindle 7. The box 3 at the right in Fig. 1 is bored in the direction of the length of the caliper to receive snugly but adjustably therein the sleeve 8, which receives and holds adjustably therethrough the spindle 9. Both of these boxes are bored at a right angle, respectively, to the spindle 7 and to the sleeve 8 to receive therein a spindle and a sleeve-clamping device. The bore for the clamping device intersects near one side the bore for the spindle and for the sleeve. The clamping device may consist of a screw 10, provided with a head 11, that fits snugly but movably in the clamping-device bore in the box and bears at its inner end, by means of a suitably-faced surface of the inner end of the head 11, against the spindle or the sleeve. A collar 12, loose on the screw 10, also fits in the bore of the box opposite and complementary to the head 11 on the screw and bears, by a suitably-faced portion thereof, against the spindle 7 or the sleeve 8. A thumb-nut 13, turning on the screw 10, bears against the collar 12, and by a turning down of the nut the collar 12 and the head 11 resisting oppositely against the box are made to clamp on the spindle 7 or sleeve 8 and to clamp them firmly in place in the box. A nut 14, turning by screw-thread on the exterior of the sleeve 8 against the end of the box 4, is adapted to pull, and thereby adjust, the sleeve 8 endwise inwardly in the box, in which it fits snugly but movably.

The spindle 9 is provided on its outer end with a micrometer 15, which is a means in common use for adjusting a spindle of this character with great exactness; but which micrometer forms no part of my invention, and a further description of it is not here required.

In initially adjusting the sleeve 8 in place in the box 4, the nut 14 being removed from the sleeve, the sleeve is inserted in the bore in the box, but as it fits snugly therein is pushed toward its seat only approximately, and the nut 14 is then put on the sleeve and turned down against the box to such extent as is necessary to draw the sleeve 8 into the box to the place desired, and thereupon the sleeve is clamped in place by the clamping device.

The body 2 of the frame of the caliper is, as has hereinbefore been stated, constructed of sheet-steel. For this purpose a blank A is cut from sheet-steel in the form shown in Fig. 5, and this blank is then folded along its longitudinal axis, the fold being of a semicircular form, as indicated in Fig. 7 and in Fig. 2, thereby bringing the leaves of the blank thus formed opposite and parallel to each other at a distance apart. Thereupon this straight but folded blank is bent, and thereby curved, into the form longitudinally shown in Figs. 6 and 7, and thereafter the outer edges of the thus-formed structure are brought together along a medial exterior line and are brazed to each other throughout the entire length of the frame in the manner best shown in Fig. 2, thus forming the completed body of the frame. (Shown in Fig. 1.) This body of the frame is of crescent form, being constructed of sheet-steel and being wider transversely at its middle portion than it is at the end or leg portions is, notwithstanding it is hollow, very strong. The form and character of the structure is such as to give it truss-like strength. The middle and medial portions of the frame being wider than the terminal portions gives it strength in the medial portion transversely, especially in radial direction from the axis of the spindles. The frame is thus made absolutely rigid against any yielding or bending or vibration that would otherwise permit of the end movement or lateral movement of the spindles even to the slightest extent, and with all the frame is very light, so that the implement can be easily and readily handled with absolute reliance on its rigidity, even though of large size. It will be understood that because of the greater width of the body of the frame medially the frame is made strong in and throughout the medial portion thereof, where strength against collapsing or vibrating is required, while since the frame diminishes in size toward the ends of the legs where less strength in transverse direction is sufficient not only great and sufficient strength is obtained in the frame, but also the minimum of lightness, and thereby capability of being easily manipulated is also secured.

What I claim as my invention is—

1. A caliper, comprising a crescent-shaped hollow frame, solid boxes fitted and secured to the legs of the frame, and spindles adjustable endwise in the boxes in the direction of the length of the caliper.

2. In a caliper, a metal hollow crescent-shaped frame of greater transverse width medially than at its ends, spindle-boxes at the ends of the frame in axial alinement with each other, and spindles adjustable endwise in the boxes.

3. A caliper-frame, formed of a single piece of sheet-steel initially of elongated and medially-widened form folded centrally longitudinally and bent into arched shape along and about its folded line, its outer edges being brought together and brazed to each other forming a flattened oblong structure in cross-section, wider radially medially than near and at its ends.

4. A caliper-frame formed of a single piece of sheet-steel folded and bent along its central longitudinal line into widened hollow form in cross-section and bent into arched form along its length and brazed together along its outer edge being hollow in its complete structure flattened radially and of maximum strength and minimum lightness.

5. In a caliper, a hollow crescent-shaped frame of sheet-steel the sheet being folded centrally longitudinally and bent along and about its inner central longitudinal line, and spindle-holding boxes fitted into and secured in the hollow ends of the sheet-steel frame.

6. In a caliper, a frame, a spindle-box in the frame the box being bored transversely in one direction for the spindle and being bored transversely at a right angle to the spindle-bore for a clamping device, the clamping-device bore intersecting the spindle-bore, a cylindrical spindle in the spindle-bore, and a clamping device loose and movable endwise in the clamping-device bore, the clamping device consisting of a screw with a head fitting and movable endwise without revolution in the clamping-device bore, a collar on the screw complementary to the head of the screw also fitted and movable endwise without revolution in the clamping-device bore, the head on the screw and the collar being adapted to bear opposite each other against the spindle and when drawn toward each other to force the spindle against the opposite wall of the spindle-bore but without tendency to move the spindle otherwise in the bore, and a nut on the screw behind the collar adapted to draw the collar and the head of the screw toward each other and against the spindle.

7. In a caliper, a spindle-box, a screw with a head fitted in the box and bearing against the spindle, a collar loose on the screw fitted in the box and bearing against the spindle, and a thumb-nut on the screw bearing against the collar.

In testimony whereof I affix my signature in presence of two witnesses.

FRANK M. DAVIS.

Witnesses:
C. T. BENEDICT,
ANNA F. SCHMIDTBAUER.